United States Patent [19]

Doering

[11] 4,119,766
[45] Oct. 10, 1978

[54] ENERGY CELL DEVICE

[76] Inventor: Gerard A. Doering, 1403 Caves Rd., Novelty, Ohio 44072

[21] Appl. No.: 786,996

[22] Filed: Apr. 13, 1977

Related U.S. Application Data

[63] Continuation of Ser. No. 640,956, Dec. 15, 1975, abandoned.

[51] Int. Cl.² .................................................. H01M 2/40
[52] U.S. Cl. .................................... 429/70; 429/81; 429/131; 429/220
[58] Field of Search ................... 429/70, 72, 81, 119, 429/131, 144, 218, 220, 209

[56] References Cited

U.S. PATENT DOCUMENTS

| | | | |
|---|---|---|---|
| 2,732,417 | 1/1956 | Barnard et al. | 429/70 |
| 3,432,350 | 3/1969 | Wilson | 429/119 |
| 3,450,566 | 6/1969 | Solomon et al. | 429/131 |
| 3,542,598 | 11/1970 | White et al. | 429/64 |
| 3,847,674 | 11/1974 | Kegelman | 429/220 X |

Primary Examiner—Charles F. Lefevour
Attorney, Agent, or Firm—Teare, Teare & Sammon

[57] ABSTRACT

An energy system of the type having a galvanic cell which is supported within a receptacle for contact with an electrolyte within the receptacle. The galvanic cell includes a solid metal core, a porous electrode having a positive charge with respect to the core, and a porous separator layer disposed between and separating the core from the electrode to enable the flow of electrolyte therebetween. The electrode and separator layer are disposed about the core and the core is of a flat configuration having a large surface area as compared to its thickness so as to provide a high power output per unit of volume of the core. The electrode and separator layer are of a multi-layer construction being made of sheet material and wrapped about the core to enable control of the surface area of the electrode and the thickness of the separator layer whereby the power output and operating life of the cell may be controlled.

9 Claims, 4 Drawing Figures

ENERGY CELL DEVICE

This is a continuation of application Ser. No. 640,956 filed Dec. 15, 1975, now abandoned.

BACKGROUND OF THE INVENTION

The present invention relates to an energy system for the production of electrical energy, and more particularly, to an energy system having a galvanic cell for the conversion of chemical energy into electrical energy.

Generally, galvanic cells include an anode, and a cathode with the latter being separated from the anode and having a charge which is positive with respect to the anode so as to produce a potential difference therebetween. Normally, an electrolyte is interposed between the anode and the cathode for the conduction of electrical energy therebetween. Conductors are connected to the anode and the cathode, which are adapted to be coupled across a load, such as any electrically operated device, including electrical motors, lights, radios, or the like.

Although formerly known galvanic cell energy systems have met with some degree of success, it has been found desirable to develop an energy system which can provide a higher power output than prior energy systems while maximizing the utilization of the core material, and still be of a simple, yet rugged construction capable of quick and easy maintenance and and repair.

SUMMARY OF THE INVENTION

The present invention contemplates providing a new and improved energy system which employs a galvanic cell for converting chemical energy into electrical energy. More Particularly, the present invention includes one or more galvanic cells which are supported within a support receptacle adapted for containing an electrolyte therein. The galvanic cell is supported for contact with electrolyte for initiating a chemical reaction as well known in the art. The galvanic cell includes a solid metal core or anode, a porous metal electrode or cathode having a positive charge with respect to the core, and a porous separator layer made of a non-conductive material which is disposed between and separates the core from the electrode to enable the flow of electrolyte therebetween. The core is of a generally flat configuration, having a large surface area as compared to its thickness. The electrode and separator layer are disposed about the core to provide a high power output per unit of volume of said core. The core is of a generally polygonal configuration, such as circular, rectangular, or the like, and the separator layer is of a multi-layer construction being made of a sheet material wrapped around the core. The electrode and separator layer comprise woven fabrics, and the electrode fabric is made from flat threads having a large area per unit of length to provide a large surface area for interaction with the surface of the core. A spray assembly is supported by the receptacle for spraying an electrolyte onto the separator layer for maintaining it in continuously damp condition. The spray assembly includes a pump assembly and a spray head mounted in overlying relation with respect to each cell. The pump assembly has an inlet connected in fluid communication with the interior of the receptacle and an outlet connected in fluid communication to the spray head whereby the electrolyte is sprayed onto the semi-conductor layer. Additionally, or alternatively, each of the cells may have one end submerged in the electrolyte to produce the chemical reaction between the electrode and the core. Preferably, the core is made of a magnesium material, and the electrode is made of a copper material. A plurality of cells may be employed and arranged so as to be electrically connected to one another, either in series or in parallel to provide the desired output characteristics for the system.

By the foregoing arrangement, there is provided an energy cell which has a very high power and current output for a given volume of core material. In addition, the arrangement provided enables the power output and operating life of the individual cells to be controlled, as desired. Further the cell is capable of a considerably long operating life, such as years, being of a very simple and rugged construction so as to be easily and readily maintained and/or repaired.

DESCRIPTION OF THE PREFERRED EMBODIMENTS

Figure 1:
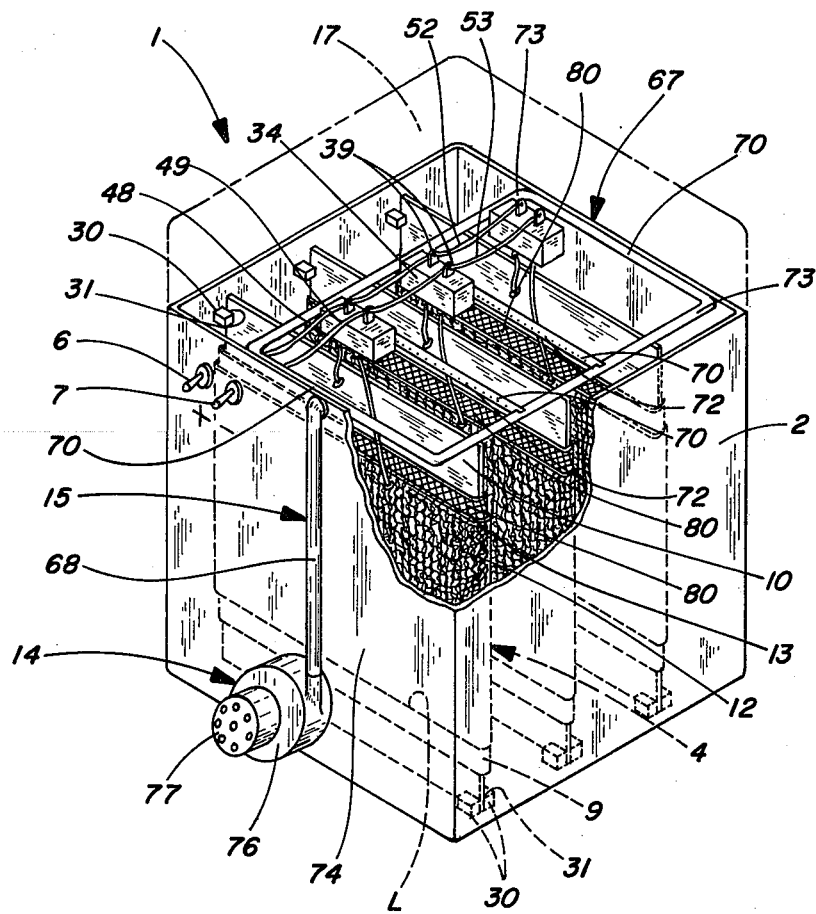
FIG. 1 is a partially cut-away perspective view of the energy system of the present invention.

The energy system of the present invention is shown in FIG. 1, generally at 1, as including a support receptacle or casing 2 which may have one or more galvanic cells, such as at 4, mounted therein. The cells 4 are connected to output terminals, such as 6 and 7, on the exterior of the casing 2, for connection to external electrical devices, as desired. The casing 2 may be filled with an electrolyte, such as at 9, for submergence of one end of each of the cells 4 therein. Each of the cells 4 includes a core, or anode 10, and an electrode, or cathode 12. The core 10 and electrode 12 are separated from one another by a porous, separator layer 13. A pump assembly 14 may be mounted on the casing 2 having its inlet connected in fluid communication with the interior of the casing 2 and its outlet connected in fluid communication to a spray assembly 15 being adapted to recirculate the electrolyte and spray it onto each cell 4 for dampening the separator layer 13 to enable a chemical reaction to occur between the core 10 and electrode 12 in a manner well known in the art. Thus, a potential difference will occur between the output terminals 6 and 7 for supplying electrical energy to external electrical devices. As shown, the casing 2 may include a removable cover, indicated by phantom lines at 17, so as to enable access to the interior of the casing 2, and to retard evaporation of the electrolyte.

Figure 2:
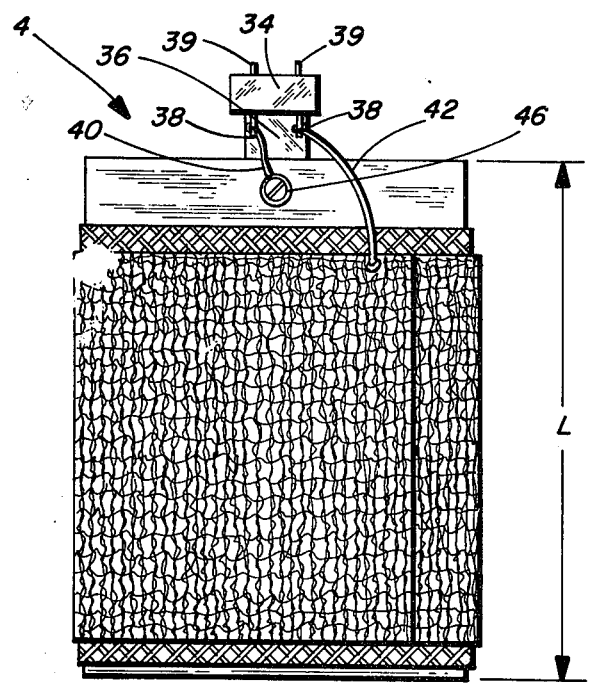
FIG. 2 is a front elevation view of the galvanic cell of the energy system of the present invention.
Figure 3:
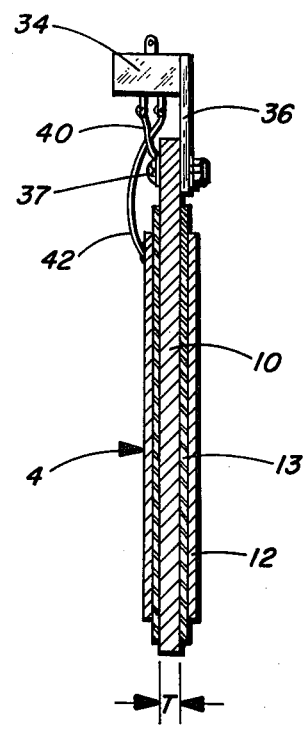
FIG. 3 is a partially-in-section, side elevation view of the galvanic cell of the present invention as taken along line 3—3 of FIG. 2.
Figure 4:
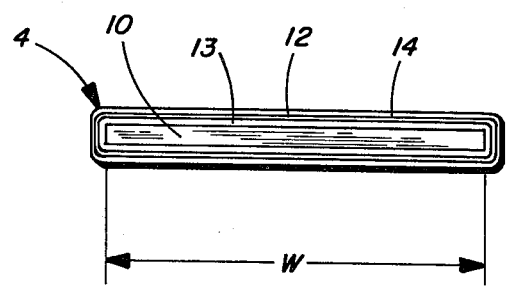
FIG. 4 is a transverse sectional view taken along the line 4—4 of FIG. 2.

A typical galvanic cell 4 of the present invention is shown in detail in FIG. 2. As shown, the core 10 comprises a flat plate which is generally polygonal in configuration, such as circular, rectangular or the like, and is made of a non-ferrous material of magnesium and/or magnesium alloy material. As the amperage of the cell 4 will vary directly to the surface area of its core, the core 10 preferably has transverse width dimension W (FIG. 4) and length dimension L (FIG. 2) which are relatively large as compared to its thickness dimension T (FIG. 3) so as to provide a large surface area per unit of volume. For example, a cell 4 having a length L of 10 inches, a width W of 6 inches, and a thickness of ¼ inch with a weight of 1 pound for good operating characteristics. Although the voltage output of each cell 4 will remain generally constant regardless of the size or shape of the core 10, the power output and current output will be increased proportional to the surface area of the core 10, and the operating life will be proportional to the size and volume of the core 10.

Preferably, the separator layer 13 is of a porous construction, such as woven or the like, being made from a fabric sheet material, such as cotton or any other absorbent material which is capable of holding moisture to enable conductivity to take place between the core 10 and the electrode 12. In the form shown, the separator layer 13 is of a multi-layer construction being wrapped directly on and foreshortened with respect to the distal ends of the core 10. When in operation, the cell 4 will generally become clogged with residue material from the chemical reaction, and thus, the length of operation of each cell is directly related to the thickness of the separator 13. Therefore, by controlling the thickness of the separator layer 13, and more particularly, the number of wraps on the core 10, the length of operation of each cell 4 can be increased or decreased, as desired.

The electrode 12 is of a porous woven construction, being made from a sheet material, in the form of copper which has a positive charge with respect to the core 10. The electrode 12 is of a multi-layer construction wrapped directly on the separator layer 13, whereby it is separated and insulated from the core 10. In addition, the electrode 12 and separator layer 13 cover in a range of approximately 85% to 95% of the total surface of the core 10 to provide optimum operating results. It has been found that an electrode 12 made of a woven sheet material in the form of an open mesh mode with flat threads with a width of approximately 0.003 inches to 0.025 inches provides very optimum results. In such case, the threads are twisted about their lengthwise axes and looped together to provide an open-mesh construction having a "percentage void area" greater than 50%. The "percentage void area" is derived by dividing the area of the openings in the mesh as the result of the looping by the area of the entire surface area prior to looping and multiplying the quotienty by 100. The foregoing construction enables the surface area of the electrode 12 to be increased by increasing the number of wraps on the separator layer 13 and provide an increase in the power and current output of the cell 4. It may be desirable to provide a cover layer 14 (FIG. 4) over the electrode 12, as such will slow the evaporation process of the electrolyte in the separator layer 13.

The electrolyte 9 preferably has a composition which is the equivalent to sea water containing approximately ¼ lb. of table salt to one gallon of water. Other solutions may also be employed to achieve satisfactory results, and more particularly, other solutions containing soap, detergent, chlorine, potassium nitrate, magnesium sulfate, or other conductive materials may be substituted for the salt water solution. In addition, acid solutions may also be employed, but in such instances, the material of the separator layer 13 must be of such a nature so as to resist deterioration when exposed to the acid solution. In this regard, the casing 2 and all other components of the energy system 1 must be fully capable of resisting deterioration from the acid solution.

As previously stated, the energy system 1 may include a single cell 4, but in the form shown, includes a plurality of cells 4 mounted in side-by-side relation within the casing 2. As shown in FIG. 1, the cells 4 may be supported in an upright position within the casing 2 in any suitable manner, but in the form shown are supported by projections as at 30, which project inwardly from the side walls of the casing 2. The projections 30 are disposed in pairs which are spaced apart from one another to form slots, as at 31, for receiving the exposed corners of the core 10 therein. Preferably, each of the slots 31 has a width which is slightly greater than the thickness of the core 10 so that each cell may be easily inserted or removed from within the casing 2.

As shown, best in FIG. 2, each of the cells 4 includes a terminal block 34 idisposed above its upper end. Each terminal block is made of an insulating material being secured to the upper end of a post 36, such as by a suitable adhesive or the like. As shown, the post 36 may project upwardly from the core 10 being secured thereto in any suitable manner, such as by a fastener 37. As further shown, each terminal block 34 may include a pair of downwardly projecting terminals 38 which are connected to the core 10 and the electrode 12 by conductors 40 and 42, respectively. A pair of output terminals 39 project upwardly from the terminal block 34, being adapted for connection to the output terminals 6 and 7 on the exterior of the casing 2, such as by conductors 48 and 49, respectively, as shown in FIG. 1. Referring again to FIG. 2, in connecting the conductor 40 to the core 10, a hole should be drilled in the core 10 to accommodate a wire of given size, and then the connecting area should be covered with a protective coating 46, such as epoxy or the like, to assure maintenance of contact between the core 10 and conductor 40. It should be understood that the foregoing arrangement enables the respective output terminals 39 of each of the cells to be interconnected, either in series or in parallel, such as by conductors 52 and 53 (FIG. 1) to provide the desired operating characteristics.

As previously stated, the energy system 1 may include a spray assembly 15 for spraying electrolyte onto the cells 4 to dampen the semi-conductor layer 13. In the form shown in FIG. 1, the spray assembly 15 includes a spray head 67 which is mounted in overlying relation with respect to each of the cells 4, and an inlet conduit 68 which extends downwardly from the spray head 67 being connected in fluid communication to the outlet of the pump 76 of the pump assembly 14. The spray head 67 may include a plurality of spaced, elongated spray conduits 70 which are positioned on opposite sides of each core 10, being disposed outwardly from and generally parallel to the general plane of each core 10. As shown, each of the spray conduits 70 may include perforations as at 72 along its length for directing a spray of electrolyte, such as at 80, inwardly and downwardly toward each core 10 and onto each separator layer 13. Each of the spray conduits 70 is shown connected at its opposite ends to supply conduits 73 which extend transversely to the general plans of each core 10. The upper end of the inlet conduit 68 may be supported by the adjacent wall 74 of the casing 2 being adapted for detachable connection to the spray head 67, such as within an opening (not shown) in the outermost spray conduit 70 to enable removal of the spray head 67 from within the casing 2 whereby the individual cells 4 may be lifted out of the casing 2 when repair or replacement is necessitated.

The pump 76 of the pump assembly 4 may be of the type sold by the Edmund Co. of Barrington, N.J., Part No. 50,345 being capable of supplying an electrolyte to each cell at a rate of 1 to 5 gallons per hour, and having an integral electric driven motor 77, which is capable of operating at low voltage, such as in a range of approximately 1½ volts to 3 volts to produce the desired electrolyte flow requirements. In addition, the electric motor 77 may be connected interiorly across the cells 4, such as at the terminals 39, whereby the energy system 1 will be entirely self-sustaining throughout the entire operating life of the cells 4.

In practice, the maximum output of each cell 4 will depend upon the degree of saturation of the semi-conductor layer 13, and the proportion of the surface area of the core 10 which is subjected to the electrolyte. Therefore, the use of a circulating pump 76 enables the separator layer 13 to be maintained at a saturation level for maximum output of each cell 4 regardless of the electrolyte level L FIG. 1) in the casing 2. In this regard, the maintenance of a sufficient supply of electrolyte to the separator layer 13 will generally offset any effect of air circulation or ambient temperature on the degree of saturation of the separator layer 13, and thus, each cell 4 can be maintained at substantially maximum output. In addition, the recirculation of the electrolyte also will provide a more uniform consumption of the core 10 even though the electrolyte level L may vary over the period of operation of the energy system 1. Still further, as the circulating pump 76 will require a given portion of the output of the unit 1, it may be desirable under certain circumstances to eliminate the pump assembly 15 altogether, and to operate the unit 1 solely by submergence of each cell 4 in the electrolyte. Of course, under such conditions the output of each cell will depend upon the total surface area of the cell 4 submerged in the electrolyte.

In the operation of a typical cell 4 having a core 10 with a length L of 10 inches, a width W of 6 inches, and a thickness T of ¼ inch, and using a salt water electrolyte as previously described, the cell will produce an output voltage or approximately 1.4 to 1.8 volts open voltage, which will remain fairly constant, from dampness to saturation. The cell 4 will have a current output in the range from 1 ampere to 4 amperes and a power output in a range from 1.4 watts to 7.2 watts max. amperage from continuous dampness to continuous saturation. In another example employing the present invention, a cell 4, having the aforementioned dimensions and an electrolyte having 2 cups of household bleach added to 1 gallon of the salt water solution as described produced a voltage output in a range from approximately 1.4 to 1.8 volts open voltage while the current output ranged from 4 amperes to 12 amperes, and the power output ranged from 5.6 watts to 21.6 watts max. amperage from dampness to saturation. As previously discussed, the operating life of each cell 4 depends on numerous conditions, but for a typical cell 4 having the aforedescribed dimensions and using a salt water electrolyte as described, each cell will operate from 12 to 24 hours after being saturated in the electrolyte, and will have an operating life of approximately 130 days with a current draw of approximately 140 miliamperes when the separator layer 13 is kept in a continuously damp condition. Under certain circumstances, where the cell 4 is located in a 100% humidity environment, it is capable of power output, but in the total absence of any humidity should have an indefinite shelf-life.

I claim:

1. An energy system which has very high power and current output for a given volume of core material with a relatively long operating life comprising,
   a support receptacle adapted for receiving a liquid electrolyte therein,
   at least one galvanic cell supported within said receptacle for fluid contact with said electrolyte,
   said galvanic cell including,
   a cathode,
   an anode made from a generally flat plate made from a non-ferrous material, selected from the group consisting of magnesium and magnesium alloy,
   a separator embodying an electrically nonconductive material physically separating said anode and cathode,
   said separator being porous to permit flow of electrolyte between said anode and cathode,
   said cathode comprising a porous, metallic multi-layer construction disposed about said separator,
   each layer of said cathode material made from a copper woven sheet material having an open-mesh construction having a percentage void area greater than 50%,
   said separator being of a multi-layer construction wrapped around said plate, and
   said cathode being wrapped around said separator.

2. A system in accordance with claim 1, wherein said cathode comprises a woven fabric made from flat threads.

3. A system in accordance with claim 2, wherein said threads have a width in a range of approximately 0.003 to 0.025 of an inch.

4. A system in accordance with claim 1, wherein, said separator comprises a woven fabric.

5. A system in accordance with claim 1, including means for circulating an electrolyte within said container for interaction with said anode and cathode.

6. A system in accordance with claim 5, wherein said means for circulating the electrolyte includes a head for spraying electrolyte downwardly onto said separator.

7. A system in accordance with claim 5, wherein said means for circulating the electrolyte includes
   a pump and an electric motor mounted on said receptacle
   and wherein,
   said motor is electrically connected to said cell for self-contained operation of said system.

8. A system in accordance with claim 1, including,
   a liquid electrolyte disposed in said support receptacle.

9. A system in accordance with claim 1, wherein said separator layer is made of a fluid absorbent material.

* * * * *